Oct. 4, 1927.
E. P. PERRIN
1,644,352
COMBINATION TOOL
Filed Oct. 28, 1926
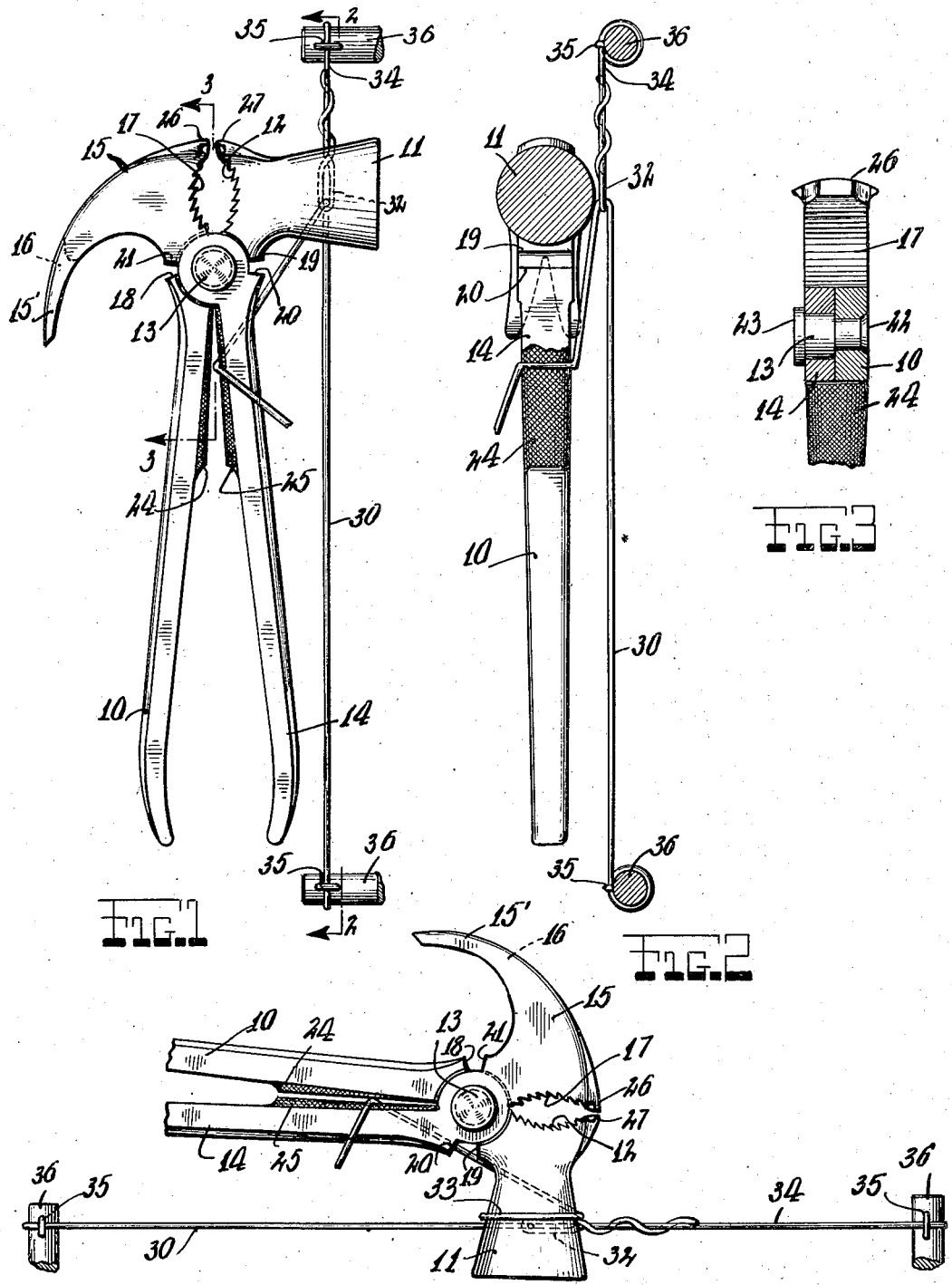
INVENTOR
Edwin P. Perrin
BY
Zoltan H. Polachek
ATTORNEY Patented Oct. 4, 1927.

1,644,352

UNITED STATES PATENT OFFICE.

EDWIN P. PERRIN, OF MAPLE CREEK, SASKATCHEWAN, CANADA.

COMBINATION TOOL.

Application filed October 28, 1926. Serial No. 144,705.

This invention relates generally to a combination hammer, the invention having more particular reference to a novel combination hammer.

The invention has for an object the provision of an improved combination hammer adapted for use in erecting wire fences and the like.

For further comprehension of the invention, and of the objects and advantages thereof, reference will be had to the following description and accompanying drawing, and to the appended claim in which the various novel features of the invention are more particularly set forth.

Fig. 1 is a side elevational view, illustrating my improved combination hammer;

Fig. 2 is a vertical sectional view taken on the line 2—2 of Fig. 1;

Fig. 3 is a vertical fragmentary sectional view taken on the line 3—3 of Fig. 1; and Fig. 4 is a side elevation view of my improved combination hammer.

As here embodied my improved combination hammer comprises a handle 10 having a head 11 suitably formed thereon at right angles to the handle 10, and having an elliptical-shaped recess 12 with a serrated edge, and an aperture to accommodate a pin 13.

The second handle 14 has an enlarged upper extremity 15 provided with curved protruding portions or ears 15', provided with an elongated slot 16, and has an elliptical-shaped recess 17 with a serrated edge, and has an aperture to accommodate the pin 13. The handle 10 and the second handle 14 are provided with extended portions 18 and 19, 20 and 21, respectively, having cutting edges.

It will be understood that the handles 10 and 14 are pivoted on the pin 13, which may be attached thereto, by riveting over the pin 13, as at 22, and by an enlarged head 23.

The handle 10 and the handle 14 are provided with tapered extended portions 24 and 25, respectively, corrugated or suitably nurled so as to form gripping surfaces, the said tapered extended portions 24 and 25 being adjacently positioned at or near the pin 13. The head 11 of the handle 10, and the enlarged upper extremity 15 of the handle 14, are provided with extended elements 26 and 27, adjacently positioned.

It will be understood that the head 11 may be used to drive nails, or the like, particularly staples.

It will be further understood that the elliptical shaped recess 12, and the second elliptical shaped recess 17, when the handles 10 and 14 are pressed or forced toward one another, may be used to grip and loosen wire, or to loosen or tighten a bolt or the like.

It will also be understood that the elongated slot 16 may be used to withdraw or pull out nails.

It will also be understood that the extended portions 18 and 19, 20 and 21, may be used to cut wire and the like.

It will also be understood that the extended elements 26 and 27, when the handles 10 and 14 are pressed or forced toward one another, may be used to withdraw or pull out nails.

Referring in particular to the operation or manipulation of my improved combination hammer, as applied to stretching and attaching wires to fence posts, or on crates, boxes, or the like, or wherever a wire or the like is stretched and attached. The wire, designated by the reference numeral 30, may be gripped tightly between the extended elements 24 and 25, when the handles 10 and 14 are pressed or forced toward one another, as clearly shown in Fig. 1 and the wire 30, when thus gripped, may be stretched, tightened, wound or twisted. It is understood that the wire 30 may be passed through a loop 32 formed in the wire 34 and then wound or twisted, by being wound around the head 11, as at 33 and it being understood that the wires 30 and 34 are attached by staples 35 or the like to the fence poles 36.

While I have described the proferred form, construction and arrangement of the several elements employed, it will be understood that the device is, nevertheless, susceptible of considerable modification; and I therefore reserve the privilege of resorting to all such changes as may be fairly embodied within the spirit and scope of the invention as claimed.

Having thus described my invention, what I claim as new and desire to protect by Letters Patent of the United States is as follows:—

In a device of the class described, a handle comprising pivotally attached sections, a hammer head on the extremity of one of said pivotal sections, and tapered corrugated extensions on the inner edges of said handle sections commencing at the pivoted joint thereof and extending rearwardly therefrom in registering relation, adapted to grip the end portion of a wire, for firmly holding the same while intermediate portions of said wire are being wound around said hammer head by manipulation of said device, the space between said tapered extensions converging forwardly and terminating substantially at the pivotal point of said handle sections to provide a gripping capacity of increasing magnitude as the wire is drawn forwardly during the winding operation.

In testimony whereof I have affixed my signature.

EDWIN P. PERRIN.